United States Patent [19]

Hanson et al.

[11] Patent Number: 5,493,565

[45] Date of Patent: Feb. 20, 1996

[54] GROOMING DEVICE FOR STREAMLINING A PLURALITY OF INPUT SIGNAL LINES INTO A GROUPED SET OF OUTPUT SIGNALS

[75] Inventors: Gary D. Hanson; Richard Schroder; E. Lawrence Read, all of Plano; Steven D. Sensel, The Colony; Long V. Vo, Garland, all of Tex.

[73] Assignee: DSC Communications Corporation, Plano, Tex.

[21] Appl. No.: 288,330

[22] Filed: Aug. 10, 1994

[51] Int. Cl.⁶ .............................. H04J 3/06; H04L 7/033; H04Q 11/04

[52] U.S. Cl. ............... 370/55; 370/58.2; 370/105.3; 370/108; 370/112; 340/825.14; 340/825.79; 375/373

[58] Field of Search .................. 370/55, 56, 58.1, 370/58.2, 58.3, 60, 65.5, 66, 67, 84, 99, 100.1, 102, 105.1, 108, 110.1, 112, 13, 15, 16; 340/825.03, 826, 827, 825.79, 825.8, 825.06, 825.14, 825.16, 825.17, 825.2; 379/268, 269, 271, 272, 273, 291, 335; 359/115, 135; 375/354, 371, 373, 376, 377

[56] References Cited

U.S. PATENT DOCUMENTS

| | | | |
|---|---|---|---|
| 4,412,323 | 10/1983 | Abbott et al. | 370/16 |
| 4,768,188 | 8/1988 | Barnhart et al. | 370/80 |
| 4,797,589 | 1/1989 | Collins | 370/63 |
| 4,967,405 | 10/1990 | Upp et al. | 370/84 |
| 4,998,242 | 3/1991 | Upp | 370/84 |
| 5,016,247 | 5/1991 | Cidon et al. | 370/81 |
| 5,040,170 | 8/1991 | Upp et al. | 370/99 |
| 5,117,422 | 5/1992 | Hauptschein et al. | 370/95.1 |
| 5,144,297 | 9/1992 | Ohara | 340/825.79 |
| 5,179,552 | 1/1993 | Chao | 370/60 |
| 5,185,736 | 2/1993 | Tyrrell et al. | 370/55 |
| 5,256,958 | 10/1993 | Eng et al. | 370/56 |
| 5,267,239 | 11/1993 | Pospischil et al. | 370/112 |
| 5,283,785 | 2/1994 | Ferguson | 370/55 |
| 5,287,535 | 2/1994 | Sakagawa et al. | 370/60 |
| 5,291,485 | 3/1994 | Afify et al. | 370/99 |
| 5,301,055 | 4/1994 | Bagchi et al. | 359/139 |
| 5,311,501 | 5/1994 | Takatsu | 370/16 |

*Primary Examiner*—Alpus Hsu
*Attorney, Agent, or Firm*—Baker & Botts

[57] ABSTRACT

A grooming device (18) includes an inbound crosspoint switch (30) that combines proprietary STS-1 signals from any of a plurality of optical terminators (16) into a grouped set of output signals for transmission to a broadband matrix subsystem through dedicated matrix interfaces (20). The inbound crosspoint switch (30) includes a crosspoint matrix (72) that receives each of the plurality of input signal lines at each output signal port and selects which input signal line is connected to which output signal port as determined by a microprocessor controller (78). Each output signal port has a register (90) for storing information as to which input signal line is to be connected to that port. A decoder (92) generates a control signal from the information stored in the register (90) to drive a multiplexer (94) for selection of the appropriate input signal line.

16 Claims, 3 Drawing Sheets

GROOMING DEVICE FOR STREAMLINING A PLURALITY OF INPUT SIGNAL LINES INTO A GROUPED SET OF OUTPUT SIGNALS

TECHNICAL FIELD OF THE INVENTION

The present invention relates in general to telecommunication network interfaces and more particularly to a grooming device for streamlining a plurality of input signal lines into a grouped set of output signals.

BACKGROUND OF THE INVENTION

In a telecommunication network telecommunication signals are routed through a matrix system for appropriate connections within the network. Transmission lines carrying the telecommunication signals are connected to the matrix system for signal routing. Unused transmission lines tied to the matrix system occupy vital matrix resources that could be put into use by additional active transmission lines. Therefore, it is desirable to increase the capacity of a matrix system and allow more active transmission lines access to matrix resources.

From the foregoing, it may be appreciated that a need has arisen for a device that can conserve connections to a matrix system. A need has also arisen for a device that does not allow unused transport capacity from occupying matrix resources. Further, a need has arisen to increase the input capacity of interface devices in a telecommunications network.

SUMMARY OF THE INVENTION

In accordance with the present invention, a grooming device for streamlining a plurality of input signal lines into a grouped set of output signals is provided which substantially eliminates or reduces disadvantages and problems associated with conventional telecommunication signal processing.

According to an embodiment of the present invention, there is provided a grooming device for streamlining a plurality of input signal lines into a grouped set of output signals that includes a retimer circuit operable to receive each of the plurality of input signal lines and generate an aligned input signal for each of the plurality of input signal lines. Each aligned input signal is fed to a crosspoint matrix operable to select any of a plurality of separate output signal ports for each of the aligned input signals, including placing any aligned input signal on multiple output signal ports.

The grooming device of the present invention provides for various technical advantages. For example, one technical advantage is to select any output signal port to transmit any of the aligned input signals. Another technical advantage is to increase the number of input signal lines while maintaining conservation of connections to the broadband matrix subsystem. Yet another technical advantage is to combine signals from more than one optical terminator into a grouped set of outputs and not allow unused transport capacity from occupying matrix resources. Other technical advantages are readily apparent to one skilled in the art from the following descriptions, figures, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
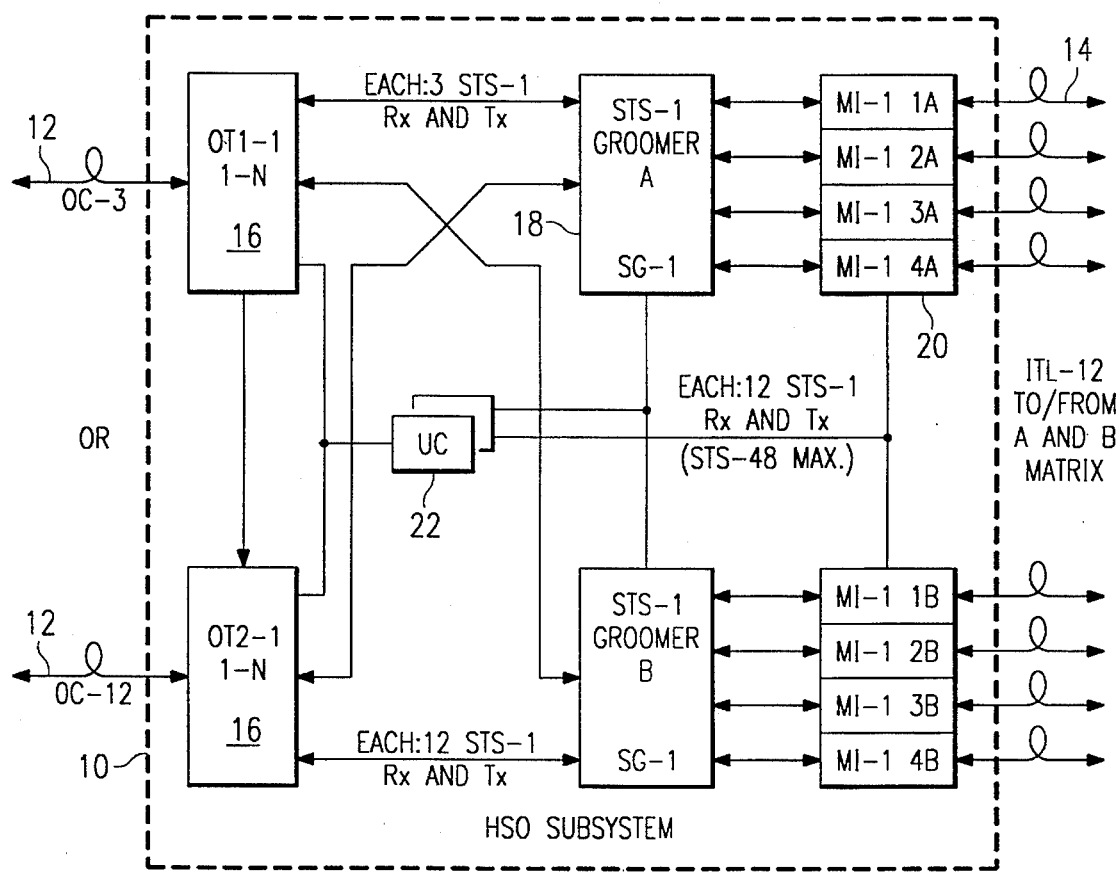
FIG. 1 is a block diagram of a high speed optical unit for use in a broadband telecommunication system.

FIG. 1 is a block diagram of a high speed optical unit 10. High speed optical unit 10 receives optical signals 12, preferably at an OC-3 or OC-12 rate, from a telecommunications network. High speed optical unit 10 converts optical signals 12 into electrical signals having a proprietary STS-1 signal format for transmission and routing through a broadband switching matrix (not shown). The electrical proprietary STS-1 signals are carried over an internal transmission link 14 to and from the broadband switching matrix. The architectural position of high speed optical unit 10 within a broadband subsystem is shown in co-pending U.S. patent application Ser. No. 08/176,548, entitled "Integrated Multi-Rate Cross-Connect System", commonly assigned with the present application to DSC Communications Corporation, and hereby incorporated by reference herein.

High speed optical unit 10 includes a plurality of optical terminators 16 that receive inbound optical signals 12 from the telecommunications network and convert optical signals 12 into electrical signals having a proprietary STS-1 format. High speed optical unit 10 also includes a pair of redundant grooming devices 18 that provide space switching of inbound and outbound proprietary STS-1 signals, automatic protection switching capability for unprotected, 1+1, 1 to 1, and 1 to n facility protection, and shared fault isolation testing capability for both inbound and outbound proprietary STS-1 signals. Inbound proprietary STS-1 signals are received from each optical terminator 16 and routed from grooming device 18 to matrix interfaces 20 for placement onto internal transmission links 14 for transmission to the broadband matrix subsystem. Matrix interfaces 20 multiplex proprietary STS-1 signals prior to transmission over internal transmission links 14. Preferably, twelve proprietary STS-1 signals are multiplexed by each matrix interface 20 into a proprietary STS-12 signal.

Outbound traffic is received from the broadband matrix subsystem at matrix interfaces 20 over internal transmission links 14. Matrix interfaces 20 demultiplex traffic from internal transmission link 14 into the proprietary STS-1 signals before being switched and protected by grooming device 18. Grooming device 18 sends the proprietary STS-1 signals to appropriate optical terminators 16 for conversion into optical signals 12 and transmission to the telecommunications network. Unit controller 22 provides direction and supervision for optical terminators 16, grooming devices 18, and matrix interfaces 20.

Figure 2:
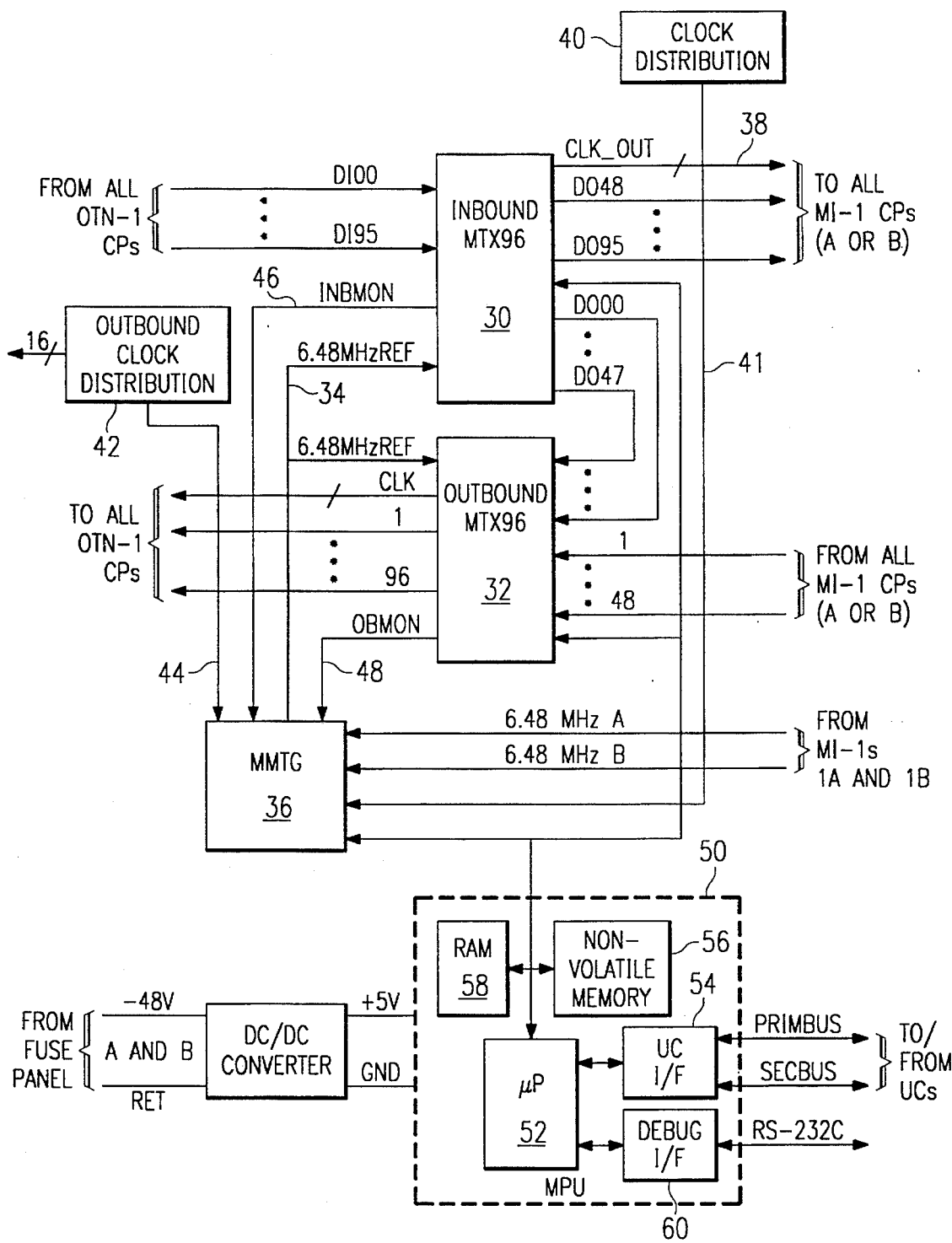
FIG. 2 is a block diagram of a grooming device used in the high speed optical unit.

FIG. 2 is a block diagram of grooming device 18. Grooming device 18 receives a plurality of proprietary STS-1 electrical signals from each optical terminator 16. In the preferred embodiment, grooming device 18 receives ninety-six proprietary STS-1 electrical signals. Grooming device 18 includes an inbound crosspoint switch 30 that receives the ninety-six proprietary STS-1 electrical signals from all of the optical terminators 16 and performs grooming on the proprietary STS-1 electrical signals to concentrate these signals into as few sets as possible for application to matrix interfaces 20. Grooming device 18 combines proprietary STS-1 electrical signals from more than one optical terminator 16 in order to conserve internal transmission link 14 connections to the broadband matrix subsystem. A matrix interface set preferably consists of 12 individual proprietary STS-1 electrical signals going to a single matrix interface 20. Preferably, one to four matrix interface sets are handled by each grooming device 18.

Inbound crosspoint switch 30 allows any of the ninety-six input proprietary STS-1 electrical signals to be routed to any of the ninety-six outputs of inbound crosspoint switch 30 or to multiple outputs thereof. The data outputs of inbound matrix crosspoint switch 30 are split into two main areas— DO00–DO47 are used for looping back up to forty-eight proprietary STS-1 electrical signals to any optical terminator 16 through an outbound crosspoint switch 32 at the outbound side of grooming device 18 for local routing purposes, and DO48–DO95 are the outputs from grooming device 18 to matrix interfaces 20.

Inbound crosspoint switch 30 and outbound crosspoint switch 32 receive an input reference clock signal 34 from a matrix monitor and timing generator 36 having a frequency of 6.48 MHz to produce a 51.84 MHz internal reference as well as output timing and clock sources. Complementary high speed clock signals 38 are transmitted from inbound crosspoint switch 30 to an inbound clock distribution circuit 40 distributing a clock signal for each proprietary STS-1 electrical signal to matrix interfaces 20 for timing purposes. Automatic protection switching on the inbound path is performed by inbound crosspoint switch 30 through reassignment of effective outputs to appropriate working or protection inputs as directed by unit controller 22.

Inbound clock distribution circuit 40 receives two sets of two complementary clocks signals 38 from inbound crosspoint switch 30. Inbound clock distribution circuit 40 includes a plurality of buffer/drivers which internally fanout each input clock. Inbound clock distribution circuit 40 provides a clock signal for each proprietary STS-1 electrical signal sent to matrix interfaces 20. Each of the four matrix interfaces 20 receive a set of twelve proprietary STS-1 electrical signals and the clocks associated with each. As a minimum, clocks for the first two proprietary STS-1 electrical signals of a set for each matrix interface 20 are transmitted by inbound clock distribution circuit 40. The clock signals for the remaining proprietary STS-1 electrical signals of each set for each matrix interface 20 are also sent unless disabled for power saver or noise reasons. Inbound clock distribution circuit 40 also generates a high speed test clock 41 for test purposes and an inbound clock 43 used for clocking in the inbound proprietary STS-1 electrical signals into matrix monitor and timing generator 36 for fault isolation of the inbound signals.

For outbound traffic, outbound crosspoint switch 32 receives from one to forty-eight proprietary STS-1 electrical signals from matrix interfaces 20. Outbound crosspoint switch 32 also receives a possible forty-eight proprietary STS-1 electrical signals from inbound crosspoint switch 30 for loopback to optical terminators 16. By having a loopback capability, grooming device 18 can cross-connect signals without going through the broadband matrix subsystem. Local traffic is more efficiently handled by this loopback capability.

Proprietary STS-1 electrical signals from matrix interfaces 20 are sent in groups or sets of twelve and outbound crosspoint switch 32 performs grooming by deconcentrating the proprietary STS-1 electrical signals from matrix interfaces 20 for transmission to appropriate optical terminators 16. Outbound crosspoint switch 32 sends either three or twelve proprietary STS-1 electrical signals to each optical terminator 16 for OC-3 signals and OC-12 signals, respectively.

Any of the ninety-six proprietary STS-1 electrical signals may be routed to any of the ninety-six data outputs of outbound crosspoint switch 32 or to multiple outputs thereof. Outbound matrix crosspoint switch 32 receives a similar input reference clock signal 34 at a 6.48 MHz rate from matrix monitor and timing generator 36 for use in producing the 51.84 MHz internal references as well as output timing and clock sources. Outbound crosspoint switch 32 generates complementary high speed clocks at the 51.84 MHz rate to an outbound clock distribution circuit 42.

Outbound clock distribution circuit 42 receives two sets of two complementary clocks from outbound matrix crosspoint switch 32. Outbound clock distribution circuit 42 includes a plurality of buffer drivers that internally fan out each input clock signal. Each optical terminator 16 receives either three or twelve proprietary STS-1 electrical signals and one corresponding clock signal for OC-3 or OC-12 applications respectively. Clock signals from outbound clock distribution circuit 42 need not be sent when there is no outbound proprietary STS-1 electrical signals. Outbound clock distribution circuit 42 also generates a high speed clock 45 for test purposes and an outbound clock 44 used for clocking in the outbound proprietary STS-1 electrical signals into matrix monitor and timing generator 36 for fault isolation of the outbound signals.

Matrix monitor and timing generator 36 performs timing alignments and fault isolation for grooming device 18. For the timing alignment function, matrix monitor and timing generator 50 receives redundant 6.48 MHz clock signals from the first of each redundant set of matrix interfaces 20. Matrix interfaces 20 derive these reference clocks from outbound internal transmission links 14 from the broadband switching matrix of the broadband system. Matrix monitor and timing generator 50 aligns these two 6.48 MHz clocks within 3 nanoseconds of each other and outputs a single 6.48 MHz reference clock to inbound crosspoint switch 30 and outbound crosspoint switch 32 for derivation of their internal 51.84 MHz clocks. The 6.48 MHz clock reference remains aligned within matrix monitor and timing generator 36 in order to prevent errors in inbound crosspoint switch 30 and outbound crosspoint switch 32 whenever there is a clock reference switch within matrix monitor timing generator 36. Clock switching within matrix monitor and timing generator 36 may occur automatically when a bad 6.48 MHz reference clock is detected or may occur under the direction of unit controller 22. For more information on the phase alignment function of matrix monitor and timing generator 36, please refer to U.S. patent application Ser. No. 08/262,921, entitled "Apparatus and Method for Clock Alignment and Switching", commonly assigned with the present application to DSC Communications Corporation, and hereby incorporated by reference herein.

The second function performed by matrix monitor and timing generator 36 is path protection and fault isolation. Monitor output 46 from inbound crosspoint switch 30 and monitor output 48 from outbound crosspoint switch 32 and associated clocks 43 and 44 are input into matrix monitor and timing generator 36. These test inputs may receive and test an inbound proprietary STS-1 electrical signal and an outbound proprietary STS-1 electrical signal simultaneously. Matrix monitor and timing generator 36 reports any errors that occur on the proprietary STS-1 electrical signals. For more information on the path protection and fault isolation, please refer to U.S. patent application Ser. No. 08/304,510, entitled "Integrated Multi-Fabric Digital Cross-Connect Integrated Office Link", commonly assigned with the present application to DSC Communications Corporation, and hereby incorporated by reference herein.

Grooming device 18 includes a microprocessor unit 50 that operates as a communication link between unit controllers 22 and grooming device 18 and as a controller/processor for groomer functions and features of grooming device 18. Microprocessor unit 50 preferably has a 68302 microprocessor 52 as its processing unit running at 8 MHz. Communication to redundant unit controllers 22 occurs through a unit controller interface 54 operating over asynchronous serial links at a 115.2 kilobyte per second rate. Microprocessor unit 50 also includes a 128 k×8 electrically erasable programmable read only memory EEPROM 56 that contains a boot loader program for initiating download of application firmware and databases. A 128 k×8 random access memory 58 allows for scratch pad memory and status registers. A debug interface 60 allows for connection to an ASCII terminal for hardware or software debugging.

Figure 3:
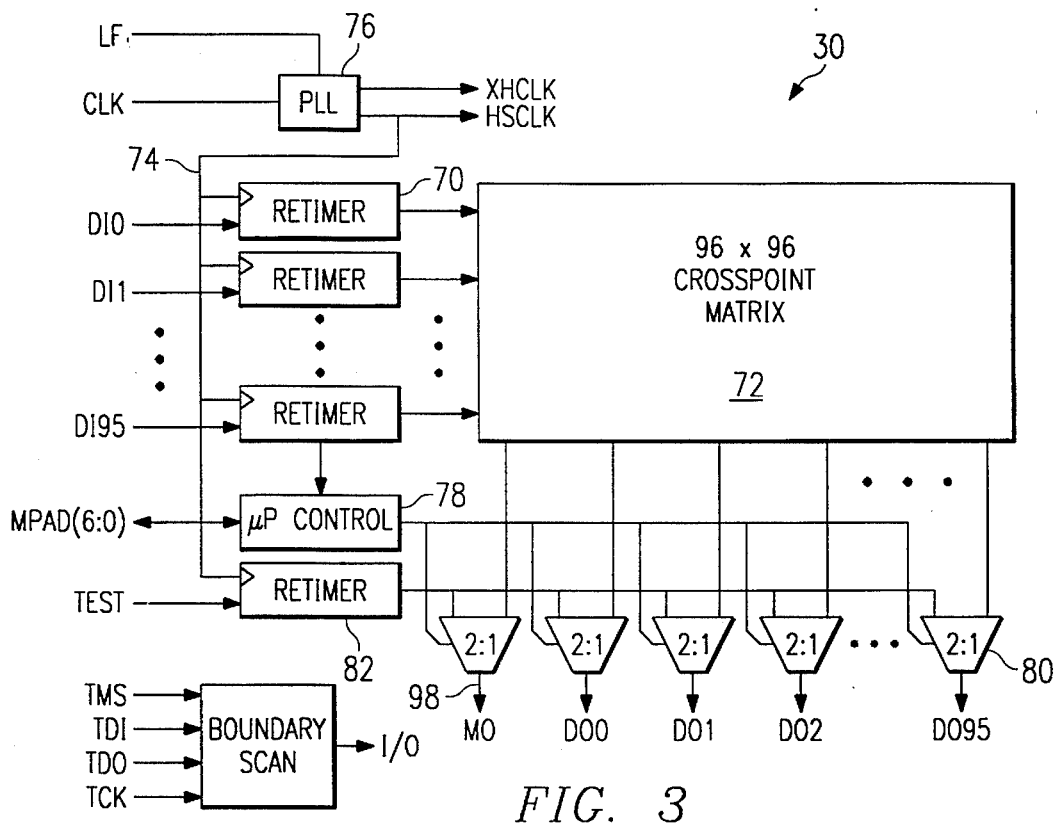
FIG. 3 is a block diagram of a crosspoint switch used in the grooming device.
Figure 4:
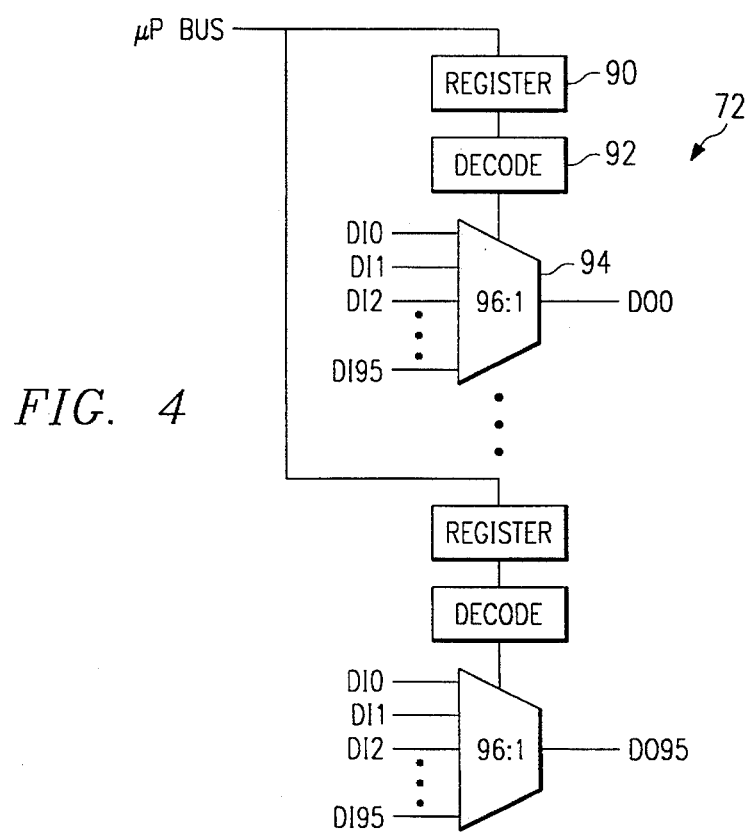
FIG. 4 is a block diagram of a crosspoint matrix used in the crosspoint switch.

FIG. 3 is a block diagram of inbound crosspoint switch 30. FIG. 3 may also represent a block diagram for outbound crosspoint switch 32. Inbound crosspoint switch 30 includes a plurality of retimer circuits 70, one for each of the ninety-six inputs received by inbound crosspoint switch 30 from optical terminators 16. Proprietary STS-1 electrical signals flow into inbound crosspoint switch 30 at retimer circuits 70 and into a crosspoint matrix 72 according to a clock signal 74 from a phase lock loop circuit 76. Phase lock loop circuit 76 receives the input reference clock signal 34 and generates the internal 51.84 MHz internal reference signal to drive retimer circuits 70. Crosspoint matrix 72 switches and routes each of the ninety-six inputs to a selected one or more of the ninety-six outputs according to a microprocessor controller 78. Each output of crosspoint matrix 72 is connected to one of a plurality of multiplexers 80 that determine the output of inbound crosspoint switch 30 between crosspoint matrix 72 signals and signals from a test retimer circuit 82 in response to a command from microprocessor controller 78. For more information on the operation of retimer circuits 70 and phase lock loop circuit 72 of crosspoint switch 30, please refer to U.S. patent application Ser. No. 08/161,906, entitled "Data Phase Alignment Circuitry", commonly assigned with the present application to DSC Communications Corporation, and hereby incorporated by reference herein.

Retimer circuits 70 capture inbound signals for alignment through the use of the internal 51.84 MHz internal reference signal generated by phase lock loop circuit 76 along with four separate phase signals of the internal reference signal. Once inbound signals are recaptured and aligned by retimer circuits 70, crosspoint matrix 72 provides programmable switching of the aligned signals from retimer circuits 70. Programming of input to output is done through microprocessor controller 78. FIG. 7 is a block diagram of crosspoint matrix 72. Every output of crosspoint matrix 72 has a register 90 to store the information of which input will be routed to that output. A decode circuit 92 reads the information stored within register 90 to determine which of the ninety-six inputs are fed to the output of a multiplexer 94. Any input can be switched to any output of crosspoint matrix 72.

After passing through crosspoint matrix 72, aligned signals are then output through multiplexers 80. Even numbered outputs are clocked with the rising edge of the internal 51.84 MHz clock while odd number outputs are clocked with the falling edge of the 51.84 MHz clock. Microprocessor controller 78 determines whether the outputs of crosspoint matrix 72 or a test signal from test retimer circuit 82 leave inbound crosspoint switch 30. A monitor output 98 is also provided and can monitor any path. The monitor output can be disabled along with all the other output signal ports through microprocessor controller 78. The monitor output can also be independently disabled as desired.

In summary, a grooming device receives a plurality of input signal lines from a plurality of optical terminators. The grooming device can connect any of the input signal lines to any of its output signal ports for transmission of signals to a broadband matrix subsystem. The grooming device combines proprietary STS-1 signals from any of the optical terminators into a grouped set of outputs that are applied to dedicated matrix interfaces in order to conserve the number of connections to the broadband matrix subsystem.

Thus, it is apparent that there has been provided in accordance with the present invention, a grooming device for streamlining a plurality of input signal lines into a grouped set of outputs that satisfies the advantages set forth above. Although the preferred embodiment has been described in detail, it should be understood that various changes, substitutions, and alterations can be made herein. For example, though a set number of signal lines are shown, any number of signal lines can be groomed. Other examples are readily ascertainable by one skilled in the art and could be made without departing from the spirit and scope of the present invention as defined by the following claims.

What is claimed is:

1. A grooming device for streamlining a plurality telecommunication signals, comprising:

an inbound retimer circuit operable to receive a plurality of inbound input signals, said inbound retimer circuit operable to generate an aligned input signal for each of said plurality of input signals, each aligned input signal being in phase with a reference phase signal of a reference clock;

an inbound crosspoint matrix operable to receive said aligned input signals, said inbound crosspoint matrix operable to select from a plurality of inbound output signal ports for transmitting each aligned input signal to a plurality of matrix interface;

an outbound retimer circuit operable to receive a plurality of outbound input signals from said plurality of matrix interfaces, and one or more of said plurality of inbound output signal ports for receiving aligned input signals in order to provide for looping back local traffic without transmitting aligned input signals to said matrix interfaces, said outbound retimer circuit operable to generate an aligned output signal for each of said plurality of outbound input signals, each aligned output signal being in phase with said reference phase signal of said reference clock;

an outbound crosspoint matrix operable to receive said aligned output signals, said outbound crosspoint matrix operable to select from a plurality of outbound output signal ports for transmitting each aligned output signal.

2. The grooming device of claim 1, further comprising:

a microprocessor controller unit operable to determine which inbound and outbound output signal ports carry which aligned input and output signals respectively.

3. The grooming device of claim 1, wherein said inbound and outbound retimer circuits include a phase lock loop circuit operable to generate a plurality of clock phase signals from said reference clock, said plurality of clock phase signals including said reference phase signal, said inbound and outbound retimer circuits capturing an active inbound and outbound input signal respectively with one of said plurality of clock phase signals, said inbound and outbound retimer circuits aligning said captured active inbound and outbound input signal to said reference phase signal.

4. The grooming device of claim 1, wherein said inbound and outbound crosspoint matrices include a multiplexer at each inbound and outbound output signal port operable to receive each aligned input and output signals respectively, said multiplexer operable to select a specific aligned input and output signal for transmission onto a respective inbound and outbound output signal port.

5. The grooming device of claim 1, wherein said inbound and outbound crosspoint matrices include a register at each inbound and outbound output signal port operable to store information identifying which aligned input and output signal is to be placed on a respective inbound and outbound output signal port.

6. The grooming device of claim 5, wherein said inbound and outbound crosspoint matrices include a decoder at each inbound and outbound output signal port operable to process information within said respective registers, said decoder operable to generate a signal for controlling which aligned input and output signal is placed on a respective inbound and outbound output signal port.

7. The grooming device of claim 1, further comprising:
a matrix and monitor timing generator operable to supply said reference clock to said inbound and outbound retimer circuits.

8. The grooming device of claim 7, wherein said matrix and monitor timing generator is operable to perform fault isolation on said aligned input and output signals.

9. The grooming device of claim 1, wherein said inbound and outbound crosspoint matrices are operable to place any one of said aligned input and output signal onto a plurality of inbound and outbound output signal ports respectively.

10. A grooming device for streamlining a plurality of input signal lines into a grouped set of output signals, comprising:
an inbound crosspoint switch operable to connect to the plurality of input signal lines from a plurality of network interfaces, said inbound crosspoint switch having a plurality of output signal ports operable to transmit input signals from any of the plurality of input signal lines to a plurality of matrix interfaces;

an outbound crosspoint switch operable to receive a plurality of matrix signal lines from said plurality of matrix interfaces, said outbound crosspoint switch having a plurality of output signal ports operable to transmit matrix signals from any of the matrix signal lines to any of said network interfaces, said outbound crosspoint switch operable to receive input signals from said inbound crosspoint switch for looping back local traffic without transmitting input signals to said matrix interfaces;

a matrix monitor and timing generator operable to provide said inbound and outbound crosspoint switches with a reference clock signal for aligning said input and matrix signals to common time bases respectively;

a microprocessor unit operable to control said inbound and outbound crosspoint switches and said matrix monitor and timing generator, said microprocessor unit determining which signals are placed on said output signal ports of said inbound and outbound crosspoint switches.

11. The grooming device of claim 10, wherein said matrix monitor and timing generator is operable to monitor input and matrix signals of said inbound and outbound crosspoint switches for fault isolation purposes.

12. The grooming device of claim 10, wherein said inbound and outbound crosspoint switches include retimer circuits connected to said input and matrix signal lines and operable to generate aligned signals from said input and matrix signals, said aligned signals being aligned to said reference clock signal from said matrix monitor and timing generator.

13. The grooming device of claim 12, wherein said inbound and outbound crosspoint switches include a crosspoint matrix operable to selectively place any of said aligned signals onto any of said output signal ports.

14. The grooming device of claim 13, wherein said crosspoint matrix is operable to selectively place any one of said aligned signals onto a plurality of said output signal ports.

15. The grooming device of claim 13, wherein each output signal port includes a multiplexer operable to receive each of said aligned signals, said multiplexer selecting one of the aligned signals for transmission from an associated output signal port in response to a determination from said microprocessor unit.

16. The grooming device of claim 15, wherein each output signal port includes a register for storing information identifying which aligned signal is to be placed on an associated output signal port, said microprocessor unit providing said register with said information.

\* \* \* \* \*